United States Patent

[11] 3,598,140

| [72] | Inventor | Ned C. Myers<br>Elkhart, Ind. |
|---|---|---|
| [21] | Appl. No. | 11,215 |
| [22] | Filed | Feb. 13, 1970 |
| [45] | Patented | Aug. 10, 1971 |
| [73] | Assignee | Robertshaw Controls Company<br>Richmond, Va. |

[54] PRESSURE REGULATOR CONSTRUCTION OR THE LIKE
20 Claims, 4 Drawing Figs.

[52] U.S. Cl. .................................... 137/315, 137/510
[51] Int. Cl. .................................... F16k 31/145
[50] Field of Search ........................ 137/315, 510

[56] References Cited
UNITED STATES PATENTS

| 3,086,544 | 4/1963 | Yost | 137/315 |
| 3,299,904 | 1/1967 | Burke | 137/315 |
| 3,443,580 | 5/1969 | Kreuter | 137/315 |
| 3,520,321 | 7/1970 | Skoli | 137/510 X |

*Primary Examiner*—Harold W. Weakley
*Attorney*—Candor, Candor & Tassone

ABSTRACT: A pressure regulator comprising a cup-shaped housing member carrying a movable valve member for controlling fluid pressure and a rotatable adjusting member snap fittingly carried by the housing member and having a threaded portion provided with an end disposed in aligned relation with the valve member. A spring retainer is threaded to the threaded portion of the adjusting member and is splined to the housing member whereby rotational movement of the adjusting member causes axial movement of the retainer relative to the housing member, the spring retainer having a portion thereof disposed between the end of the adjusting member and the valve member. A compression spring has one end bearing against the valve member to tend to move the same in one direction and has the other end thereof secured to the portion of the spring retainer to be carried thereby.

INVENTOR.
NED C. MYERS

BY
Candor, Candor & Tassone

HIS ATTORNEYS

INVENTOR.
NED C. MYERS

PRESSURE REGULATOR CONSTRUCTION OR THE LIKE

This invention relates to an improved pressure regulator or the like.

It is well known that pressure regulators have been provided wherein the fluid pressure in a control system is prevented from exceeding a desired pressure as adjustably set by a pressure regulator disposed in such control system.

Accordingly, it is a feature of this invention to provide an improved pressure regulator for such purpose or the like, the pressure regulator of this invention having the parts thereof formed in a simple and economical manner to permit the same to be assembled together in a simple and effective manner.

In particular, one embodiment of this invention provides a pressure regulator having a cup-shaped housing member carrying a movable valve member for controlling fluid pressure directed to the closed end wall thereof. A rotatable adjusting member is snap fittingly secured to the housing member while being rotatable relative thereto, the adjusting member having a threaded portion provided with an end disposed in aligned relation with the valve member. A spring retainer is threaded to the threaded portion of the adjusting member and is splined to the housing member whereby rotational movement of the adjusting member causes axial movement of the retainer relative to the housing member. The spring retainer has a portion thereof disposed between the end of the adjusting member and the valve member. A compression spring has one end bearing against the valve member to tend to move the valve member in one direction and has the other end thereof secured to the portion of the spring retainer that is disposed between the end of the adjusting member and the valve member whereby rotation of the adjusting member varies the force of the compression spring tending to move the valve member in a valve-closing direction.

Accordingly, it is an object of this invention to provide an improved pressure regulator having one or more of the novel features set forth above or hereinafter shown or described.

Other objects, uses and advantages of this invention are apparent from a reading of this description which proceeds with reference to the accompanying drawings forming a part thereof and wherein.

Figure 1:
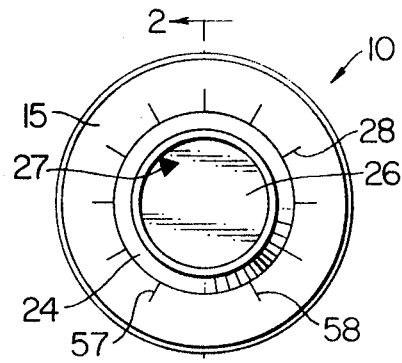
FIG. 1 is a front view of the pressure regulator of this invention.

While the various features of this invention are hereinafter described and illustrated as being particularly adapted to maintain a source of pressure fluid from exceeding a preselected pressure level, it is to be understood that the various features of this invention can be utilized single or in any combination thereof to provide a regulator for other types of fluid systems as desired.

Therefore, this invention is not to be limited to only the embodiment illustrated in the drawings, because the drawings are merely utilized to illustrate one of the wide variety of uses of this invention.

Figure 2:
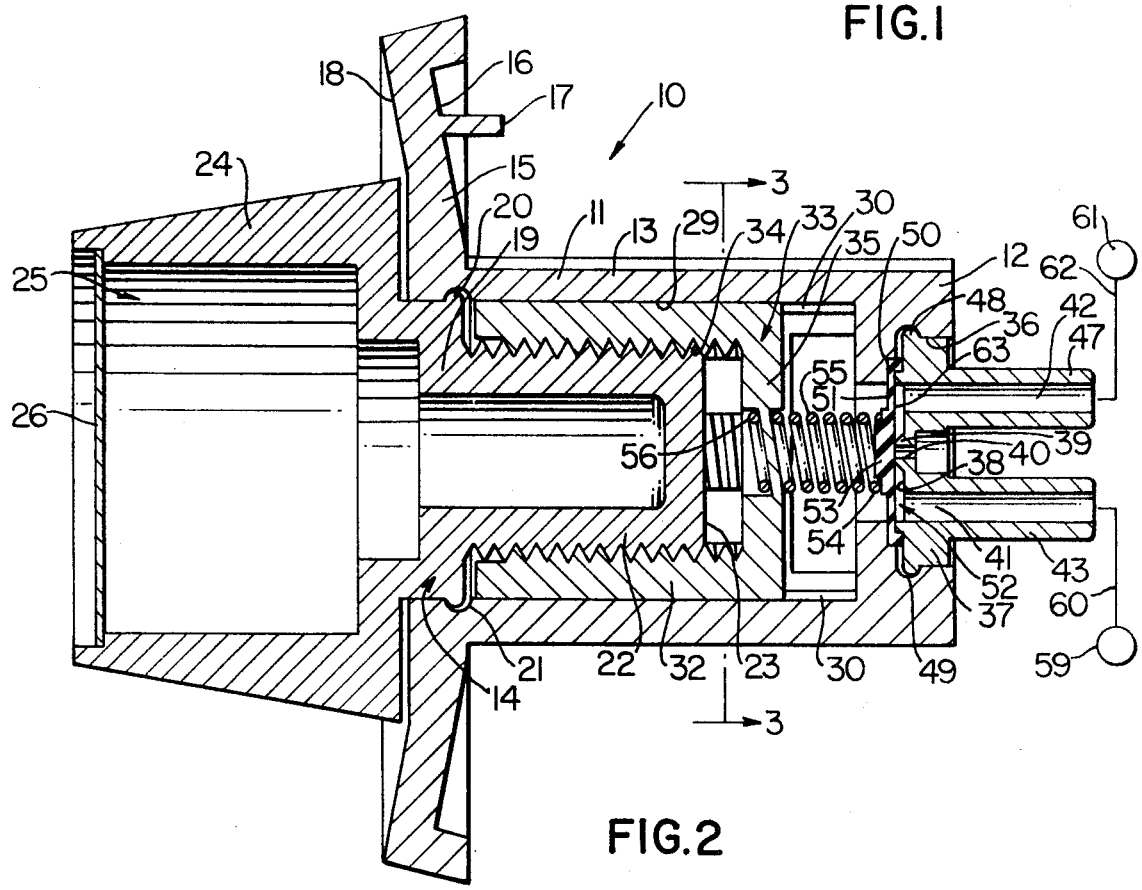
FIG. 2 is an enlarged cross-sectional view taken on line 2-2 of FIG. 1.
Figure 4:
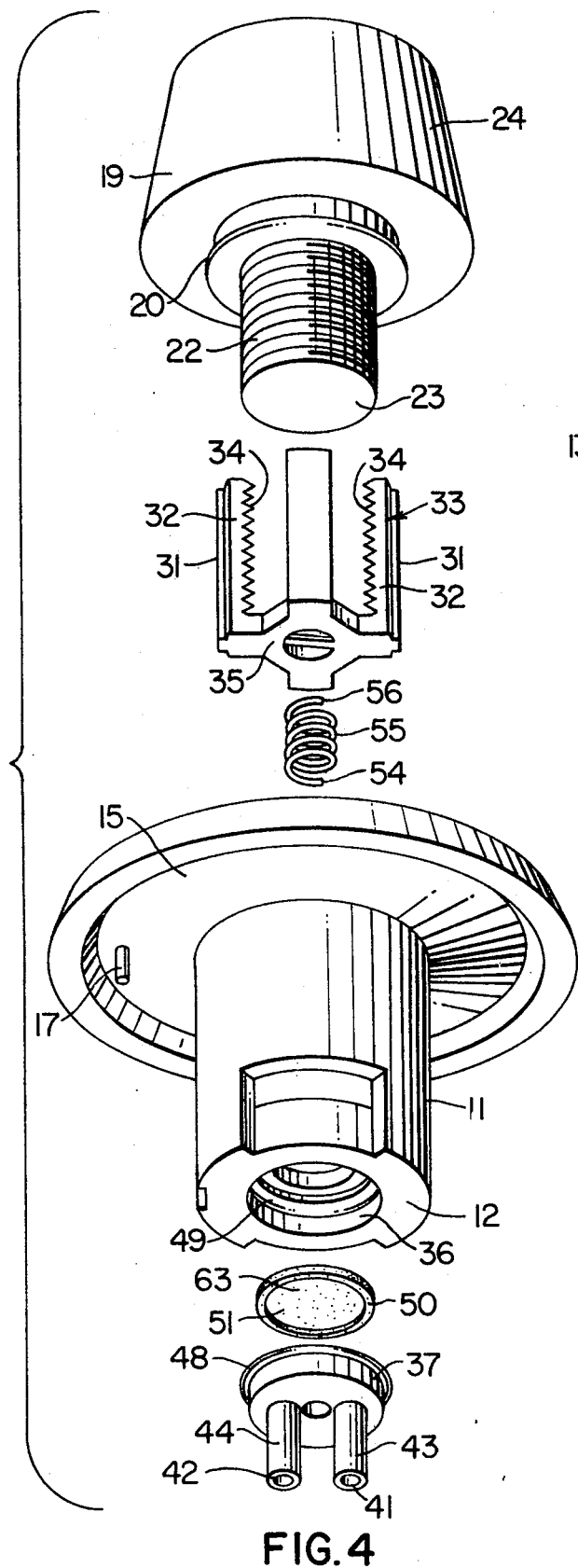
FIG. 4 is an exploded perspective view of the various parts of the pressure regulator of FIG. 1.
Figure 3:
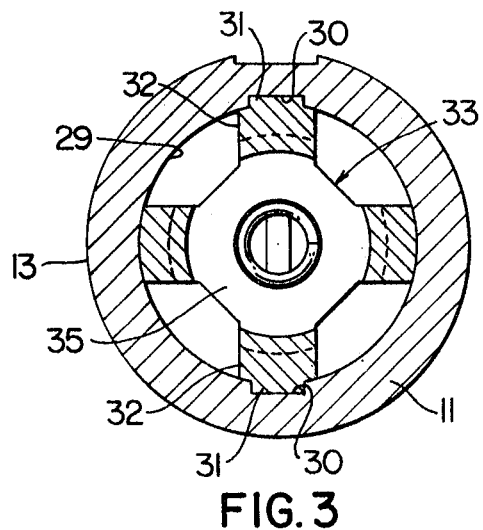
FIG. 3 is a cross-sectional view taken on line 3-3 of FIG. 2.

Referring now to FIGS. 1 and 2, the improved pressure regulator of this invention is generally indicated by the reference numeral 10 and comprises a cup-shaped housing member 11 having a closed end wall 12 at one end of a substantially cylindrical sidewall means 13 and an opposed open end 14 at the other end of the cylindrical sidewall 13, an outwardly directed flange 15 extending from the open end 14 of the cup-shaped housing member 11 to provide a dial face structure on which can be printed suitable index information, or alternately, if the cup-shaped housing member 11 is formed of transparent material, an information sheet can be disposed against the under side 16 of the flange 15 to be located thereon by locating means 17 so that the information sheet can be viewed through the front side 18 of the flange means 15. While such flange means 15 is illustrated in FIG. 1 as being substantially circular, it is to be understood that the same can be of any desired frontal configuration, such as being substantially square or rectangular, as desired.

An adjusting member 19 is snap fitted to the cup-shaped housing member 11 because the adjusting member 19 has an outwardly directed annular flange 20 snap fittingly received in an annular groove 21 formed in the cup-shaped housing member 11 so that the adjusting member 19 is not only secured to the cup-shaped housing member 11, but also is rotatable relative thereto through the cooperation of the annular flange 20 and annular groove 21.

The adjusting member 19 includes an externally threaded portion 22 having an end 23 directed towards the closed end 12 of the cup-shaped housing member 11, the adjusting member 19 including an enlarged substantially hollow frustoconical knoblike portion 24 disposed outboard of the open end 14 of the cup-shaped housing member 11. The open end 25 of the adjusting member 19 can be closed by a suitable plate 26 that can carry a pointer 27, FIG. 1, to cooperate with the index or information 28 of the flange 15 of the housing member 11.

The inside surface 29 of the cylindrical sidewall 13 of the cup-shaped housing member 11 is provided with opposed longitudinal grooves or recesses 30 throughout the length thereof which are adapted to respectively receive longitudinal projections 31 formed along opposed legs 32 of a substantially cup-shaped spring retainer 33 having the interior surface 34 of the legs 32 threaded to cooperate with the threaded portion 22 of the adjusting member 19 as illustrated in FIG. 2. In this manner, rotational movement of the adjusting member 19 will cause the retainer 33 to axially move in the cup-shaped housing member 11 so as to position the closed end 35 thereof relative to the closed end 12 of the cup-shaped housing member 11 for a purpose hereinafter described.

The closed end 12 of the cup-shaped housing member 11 is provided with a recess or cavity 36 which is adapted to snap fittingly receive a platelike member 37 having a surface means 38 provided with an inwardly directed valve seat 39 that has a passage means 40 passing therethrough. In addition, the surface means 38 is interrupted by two other passage means 41 and 42 which respectively pass through outwardly directed nipples 43 and 44 extending from the platelike member 37.

When the platelike member 37 is snap fitted to the cup-shaped housing member 11 in the cavity 36 thereof, an annular flange 48 of the platelike member 37 is received in an annular groove 49 of the housing member 11 so that the same are secured together with the platelike member 37 clamping an outer peripheral means 50 of a flexible diaphragm 51 against the housing member 11 as illustrated in FIG. 2 whereby the flexible diaphragm 51 cooperates with the surface means 38 of the platelike member 37 to define a chamber 52 therebetween sealed from the housing member 11. However, the valve seat 39 and passage means 41 and 42 are so constructed and arranged that the passage means 41 and 42 are always in fluid communication with the chamber 52 regardless of the position of the diaphragm or valve member 51 relative to the valve seat 39.

The medial portion 53 of the flexible diaphragm 51 is substantially thickened to telescopically receive one end 54 of a compression spring 55 having the other end 56 thereof secured to the closed end wall portion 35 of the spring retainer 33 so as to move in unison therewith. The force of the compression spring 55 is such that the same continuously tends to urge the flexible diaphragm 50 toward the valve seat 39 to close the same. However, upon rotational movement of the adjusting member 19 to axially position the spring retainer 33 in the cup-shaped housing member 11 the force of the compression spring 55 tending to move the valve member 51 toward the valve seat 39 can be varied within the axial limits of movement of the spring retainer 33 relative to the housing member 11. For example, suitable stops can be provided for the axial movement of the spring retainer 33 relative to the housing member 11 to correspond with rotational movement of the adjusting member 19 from the position indicated by line 57 in FIG. 1 in a clockwise direction around to line 58 in FIG. 1 as desired so that the force of the compression spring 55 can only be varied during such rotational movement of the adjusting member 19.

The passage means 41 of the pressure regulator 10 can be interconnected to a pneumatic pressure source 59 by a conduit means 60 being telescoped over the nipple 43 while the passage means 42 can lead to a pneumatically operated device 61 fluidly interconnected thereto by a conduit means 62 whereby the pressure regulator 10 of this invention will prevent the pressure being directed from the source 59 to the actuator 61 from exceeding the pressure setting of the control knob 24.

In particular, the operation of the control device 10 is such that when the control knob 24 is set in the desired pressure setting position thereof, such as in FIG. 1, the fluid pressure being conveyed into chamber 52 of the pressure regulator 10 and also being directed to the actuator 61 acts against the right-hand side 63 of the flexible diaphragm 51 to tend to move the same to the left in FIG. 2. Thus, when this force acting against the right-hand side 63 of the flexible diaphragm 51 exceeds the compression force setting of the compression spring 55, the medial portion 53 of the diaphragm 51 moves to the left and opens the valve seat 39 so that the fluid pressure in the chamber 52 is vented through the passage means 40 to the atmosphere until the pressure in the chamber 52 drops to the pressure setting of the control knob 24 whereby the force of the compression spring 55 again overcomes the pressure in the chamber 52 to move the valve member or diaphragm 51 against the valve seat 39 to terminate the venting of the chamber 52. In this manner, it can be seen that the opening and closing of the valve seat 39 will prevent the pressure in the chamber 52 from exceeding the pressure setting of the control knob 24.

Thus, it can be seen that the pressure regulator 10 of this invention can be formed from a relatively few parts that have been formed in an economical manner and can be snap fitted together to produce the pressure regulator without auxiliary fastening means in order to facilitate the assembly thereof.

Therefore, this invention provides an improved pressure regulator or the like.

While the form of the invention now preferred has been disclosed as required by statute, other forms may be used, all coming within the scope of the claims which follow.

What I claim is:

1. A pressure regulator comprising a housing means carrying a movable valve member for controlling fluid pressure, a rotatable adjusting member carried by said housing means and having a threaded portion provided with an end disposed in aligned relation with said valve member, a spring retainer threaded to said threaded portion of said adjusting member and splined to said housing means whereby rotational movement of said adjusting member causes axial movement of said retainer relative to said housing means, said spring retainer having a portion thereof disposed between said end of said adjusting member and said valve member, and a compression spring having one end bearing against said valve member to tend to move the same in one direction and having the other end thereof secured to said portion of said spring retainer.

2. A pressure regulator as set forth in claim 1 wherein said housing means is substantially cup-shaped with the closed end thereof carrying a valve seat that is controlled by said valve member.

3. A pressure regulator as set forth in claim 2 wherein said adjusting member is disposed in said cup-shaped housing means and has means snap fitting itself to said housing means while being rotatable relative to said housing means.

4. A pressure regulator as set forth in claim 3 wherein said cup-shaped housing means has an annular groove, said adjusting member having an annular flange snap fittingly received in said groove to provide said snap-fit relation and rotational movement between said housing means and said adjusting member.

5. A pressure regulator as set forth in claim 3 wherein said adjusting member has an integral knoblike portion that projects beyond the open end of said cup-shaped housing means.

6. A pressure regulator as set forth in claim 1 wherein said retainer is substantially cup-shaped with the closed end thereof defining said portion that is disposed between said end of said adjusting member and said valve member.

7. A pressure regulator as set forth in claim 6 wherein the sides of said cup-shaped retainer have recesses passing therethrough.

8. A pressure regulator as set forth in claim 1 wherein said housing means has a surface means interrupted by an inlet passage means and an outlet passage means, said valve member controlling the degree of interconnection between said passage means.

9. A pressure regulator as set forth in claim 8 wherein said valve member comprises a flexible diaphragm carried by said housing means.

10. A pressure regulator as set forth in claim 8 wherein said housing means has a cavity interrupting a surface thereof, a platelike member snap fitted into said cavity and having said passage means therein, said platelike member defining part of said housing means and having said surface means thereon.

11. A pressure regulator as set forth in claim 10 wherein said surface means of said platelike member has a valve seat interrupted by one of said passage means, said valve member comprising a flexible diaphragm having an outer periphery compressed between said platelike member and the remainder of said housing means whereby the medial portion of said diaphragm spans said valve seat.

12. A pressure regulator as set forth in claim 11 wherein said diaphragm cooperates with said platelike member to define a chamber therebetween, the other passage means always being in fluid communication with said chamber regardless of whether or not said diaphragm is opening or closing said valve seat, and another passage in said platelike member interrupting said surface means and always being in fluid communication with said chamber.

13. A pressure regulator comprising a cup-shaped housing member carrying a movable valve member for controlling fluid pressure, a rotatable adjusting member snap fitted to said housing means and having a threaded portion projecting into said housing member, a spring retainer threaded to said threaded portion of said adjusting member and splined to said housing member whereby rotational movement of said adjusting member causes axial movement of said retainer relative to said housing member, and a compression spring having one end bearing against said valve member and having the other end thereof operatively interconnected to said spring retainer.

14. A pressure regulator as set forth in claim 13 wherein said cup-shaped housing member has an annular groove, said adjusting member having an annular flange snap fittingly received in said groove to provide said snap-fit relation and rotational movement between said housing member and said adjusting member.

15. A pressure regulator as set forth in claim 13 wherein said adjusting member has an integral knoblike portion that projects beyond the open end of said cup-shaped housing member.

16. A pressure regulator as set forth in claim 13 wherein said housing member has a surface means interrupted by an inlet passage means and an outlet passage means, said valve member controlling the degree of interconnection between said passage means.

17. A pressure regulator as set forth in claim 16 wherein said valve member comprises a flexible diaphragm carried by said housing member.

18. A pressure regulator as set forth in claim 16 wherein said housing member has a cavity interrupting the closed end thereof, a platelike member snap fitted into said cavity and having said passage means therein, said platelike member defining part of said housing member and having said surface means thereon.

19. A pressure regulator as set forth in claim 18 wherein said surface means of said platelike member has a valve seat interrupted by one of said passage means, said valve member comprising a flexible diaphragm having an outer periphery compressed between said platelike member and the remainder of said housing member whereby the medial portion of said diaphragm spans said valve seat.

20. A pressure regulator as set forth in claim 19 wherein said diaphragm cooperates with said platelike member to define a chamber therebetween, the other passage means always being in fluid communication with said chamber regardless of whether or not said diaphragm is opening or closing said valve seat, and another passage in said platelike member interrupting said surface means and always being in fluid communication with said chamber.